US005626444A

United States Patent [19]

Campian

[11] Patent Number: 5,626,444
[45] Date of Patent: May 6, 1997

[54] ROTARY CUTTING TOOL

[76] Inventor: Jonathon Campian, 1900 E. 14 Mile Rd., Madison Heights, Mich. 48071

[21] Appl. No.: 293,143

[22] Filed: Aug. 19, 1994

Related U.S. Application Data

[63] Continuation-in-part of Ser. No. 208,616, Mar. 9, 1994, Pat. No. 5,429,460.

[51] Int. Cl.⁶ .................................................. B26D 1/12
[52] U.S. Cl. .......................... 407/54; 408/67; 408/207; 606/180
[58] Field of Search .................... 144/252 R; 409/137; 407/30, 53, 58, 59, 62, 64, 12; 606/180; 408/67, 203.5, 207

[56] References Cited

U.S. PATENT DOCUMENTS

| 62,123 | 2/1867 | Eglin | 407/62 |
|---|---|---|---|
| 2,437,668 | 3/1948 | Adams | 144/252 R |
| 3,058,199 | 10/1962 | Cave et al. | 407/59 |
| 4,366,468 | 12/1982 | Fucci et al. | 606/180 |
| 4,395,167 | 7/1983 | Maternus | 407/54 |
| 4,990,035 | 2/1991 | Scheuch et al. | 407/30 |

FOREIGN PATENT DOCUMENTS

| 87930 | 4/1922 | Australia | 407/53 |
|---|---|---|---|
| 736449 | 6/1943 | Germany | 407/53 |

Primary Examiner—William R. Briggs
Attorney, Agent, or Firm—Gifford, Krass, Groh, Sprinkle, Patmore, Anderson & Citkowski, P.C.

[57] ABSTRACT

A rotary cutting tool is disclosed having an evacuation bore and generally radially extending passages to conduct away material being removed by the tool cutters. In one embodiment, intersecting cutters are disposed at the intersections of right and left hand flutes in the tool shank. In another embodiment, the cutters are radially disposed on a cutting disc.

1 Claim, 2 Drawing Sheets

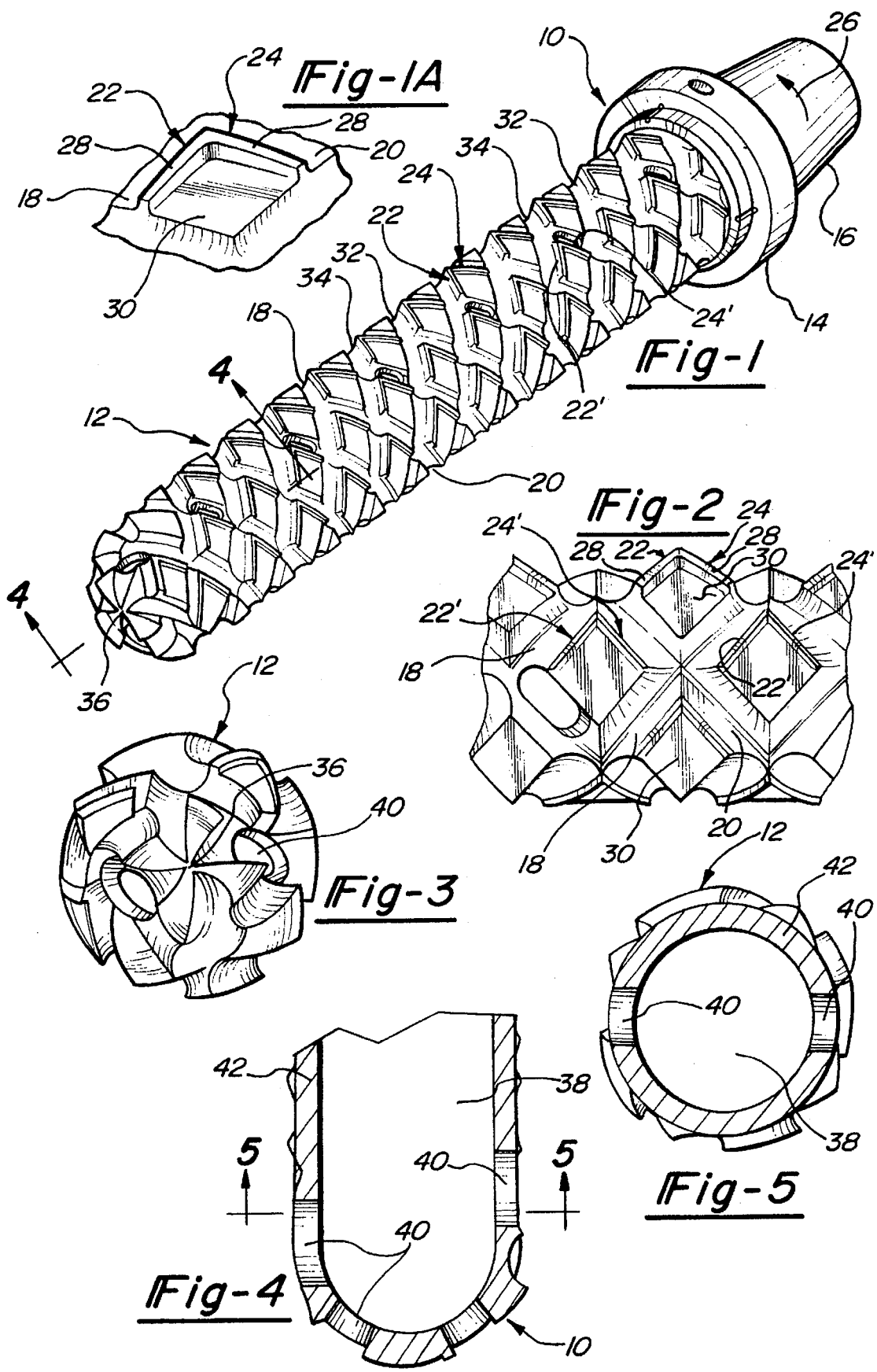

ROTARY CUTTING TOOL

REFERENCE TO THE RELATED CASE

This is a continuation-in-part of Ser. No. 08/208,616 filed Mar. 9, 1994, U.S. Pat. No. 5,429,460.

BACKGROUND OF THE INVENTION

1. Field of the Invention

The present invention relates to a cutting tool, and, more particularly, this invention relates to a rotary milling cutting tool particularly adapted for cutting an expanded synthetic resinous material such as a Styrofoam plastic.

2. State of the Prior Art

As set forth in my parent application Ser. No. 08/208,616 filed Mar. 9, 1994, expanded plastic forms are typically hand cut to shape from cast starting blocks of material. A larger starting block of the material is conveniently fabricated by laminating together two or more cast blocks. When a typical hand tool, saw or grinding type cutter is used to profile cut the block or to dress the outside surface, a relatively rough finish surface results, primarily from the cellular or bead nature of the foam or expanded plastic material which causes beads or cells to pull away from the stock block being machined.

My previously mentioned patent application sets forth the details of a machine for cutting expanded plastic workpieces. The basic parameters of the cutting tool are also disclosed which include a rotary cutter having a plurality of generally radially extending openings which fluidly communicate with the axial bore through the cutter. A source of vacuum in the machine entrains cutting material debris in air for evacuating through the radial openings and axial bore.

SUMMARY OF THE INVENTION

In its basic form, the cutting tool has a longitudinally extending cylindrical shank with an axially extending evacuation bore. Individual cutters are attached to or are an integral part of the shank, and generally radially extending ports pass air entrained with chip or material debris from the cutting flutes to the evacuation bore during the cutting-machining of a workpiece.

In one preferred embodiment of the invention, right-hand, longitudinally extending helical flute grooving and left-hand longitudinally extending helical flute grooving is formed at an angle of 30°–60° to the axis of the cylindrical body of the tool shank. An arrowhead shaped cutting flute or intersecting cutters is resultant at the plurality of intersections formed by these right-hand and left-hand helical flute groovings. Also preferably a radial relief angle and a radial clearance angle is introduced across the top periphery of each flutes hand.

With this arrangement of intersecting cutters along right-hand and left-hand flutes there will be components of force in opposite directions along the axis of the tool, and that successive axial rows of cutters will overlap diammetrical cutting paths alternating between cutters on the leading edges of a right-hand and a left-hand helical flute. These oscillating cutting forces in combination with instant evacuation of the material being removed from the workpiece produces a clean, fine finished work surface.

In another preferred embodiment of the invention, a cutting disc is located at one end of the shank extending radially outward and containing a number of circumferentially spaced radially extending cutters. Spacing between the cutters provides passages which connect to an axially extending evacuation bore.

This arrangement of cutters also provides, in combination with rapid evacuation of the material being removed during machining produces, a smooth accurate finish.

BRIEF DESCRIPTION OF THE DRAWING

A better understanding of the present invention will be had with reference to the following detailed description, when read in conjunction with the accompanying drawing, wherein like reference characters refer to like parts throughout the several views, and which:

FIG. 1 is a perspective view illustrating a preferred embodiment of the cutting tool of this invention;

FIG. 1A is an enlarged perspective view showing a single pair of intersecting cutters;

FIG. 2 is a partial elevational view of the cutting tool of FIG. 1;

FIG. 3 is an end view of the cutting tool of FIG. 1;

FIG. 4 is a cross-sectional view taken along line 4—4 of FIG. 1;

FIG. 5 is a cross-sectional view taken along line 5—5 of FIG. 4;

DETAILED DESCRIPTION OF THE PRESENTLY PREFERRED EMBODIMENTS OF THE INVENTION

Figure 6:
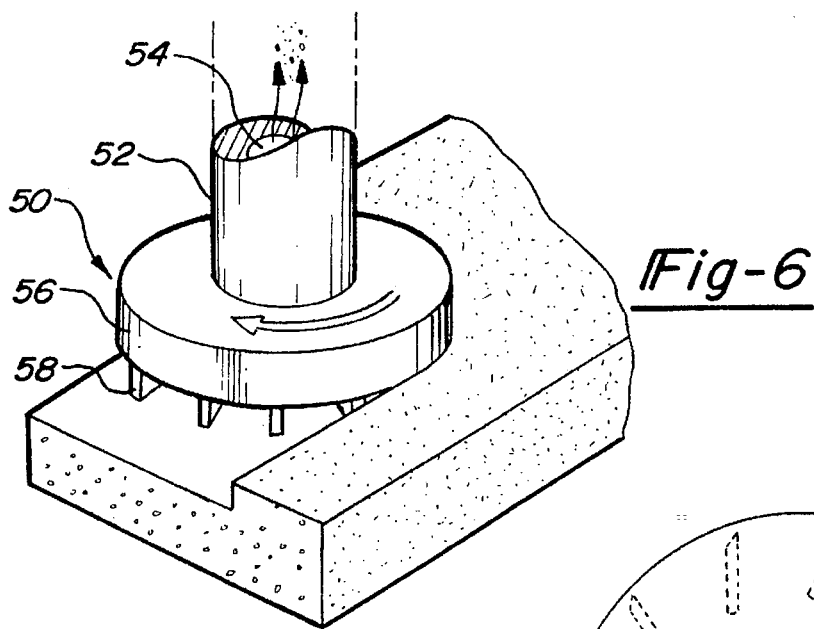
FIG. 6 is a perspective view of another embodiment of the rotary cutting tool of this invention.

Referring to FIGS. 1–5, the cutting tool 10 includes a generally cylindrical body 12 with a mounting flange 14 and tapered shank 16 at one end. Right and left-hand helical flute groovings 20 and 18 are cut into the cylindrical body 12. Intersecting cutters 24 and 22 are located at the intersections of the groovings 20 and 18. Primary clearance is provided by a radial relief angle on the land 28 extending from the leading edge of the cutters 22 and 24 with secondary clearance being provided in the recessed area 30 behind the lands 28.

Commonly, the cutting tool 10 of FIGS. 1–5 will have a body diameter 12 of ½" to 3" and a working length of 6–20 being typical. The helical grooving 18 and 20 will also typically be a multiple thread or flute, with the right-hand helical grooving 18 illustrated in FIG. 1 having four equally spaced parallel flutes with adjacent flutes 32 and 34 being identified.

Rotary cutting tool 10 is in the form of a ball end mill with a drill starting point 36 which can be used in starting a facing or profiling cut. A flat end mill version can also be used. An evacuation bore 38 extends the length of the tool with radial ports 40 extending through the tool wall 42 to conduct away the material being removed by machining through the tool wall and into the bore.

It can be seen in FIGS. 1, 1A and 2 that the intersecting cutters 22 and 24 at the leading edges of right and left hand cutters 24 and 22 will produce components of force in opposite directions along the tool axis, and that the leading edges of right and left hand cutters 24' and 22' in the next axial row of cutters will overlap diammetrical cutting paths reversing the force components. These oscillating cutting forces in combination with instantaneous evacuation of machined material produces a clean, smooth and highly accurate surface.

Figure 7:
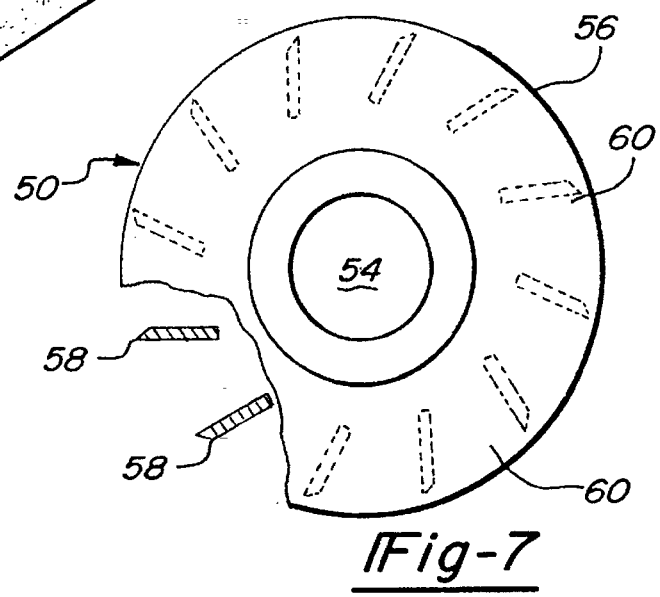
FIG. 7 is a plan view with a portion broken away of the cutting tool of FIG. 6.
Figure 8:
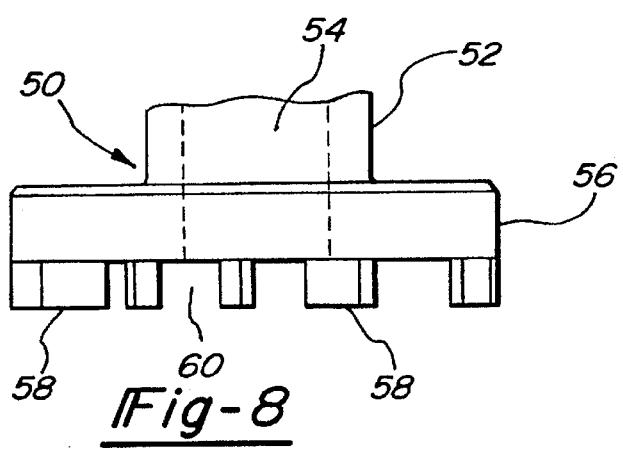
FIG. 8 is an elevational view of the cutting tool of FIGS. 6 and 7.

The cutting tool 50 of FIGS. 6–8 is in the form of a rotary facing mill having a cylindrical shank 52 with an internal evacuation bore 54 and a cutting disc 56. Circumferentially spaced, generally radially extending cutters 58 can be integrally formed or be in the form of tool inserts. The spaces between cutters 58 provide radial passages 60 to conduct the machined material into the evacuation bore 54.

Having described my invention many modifications thereto will become apparent to those skilled in the art to which it pertains without deviation from the spirit of the invention as defined by the scope of the appended claims.

I claim:

1. A rotary cutting tool particularly adapted for cutting plastic material comprising:

a longitudinally extending cylindrical shank having an axially extending evacuation bore;

right-hand longitudinally extending helical flute grooving in said cylindrical shank;

left-hand longitudinally extending helical flute grooving in said cylindrical shank;

a cutter located at each intersection of the right-hand and the left-hand helical flute groovings, each cutter having a pair of cutting edges, one cutting edge being parallel to said right-hand flute grooving and the other cutting edge being parallel to said left-hand flute grooving; and radially extending passages between at least one of said flute grooving and said axially extending evacuation bore;

wherein said passage means is fluidly connected to said axially extending evacuation bore so that material removed from a workpiece by said cutters is evacuated through said passage means and said axial bore.

* * * * *